April 26, 1927.
E. N. TUCKEY
AIR MOTOR
Filed Oct. 31, 1923
1,626,314
6 Sheets-Sheet 1
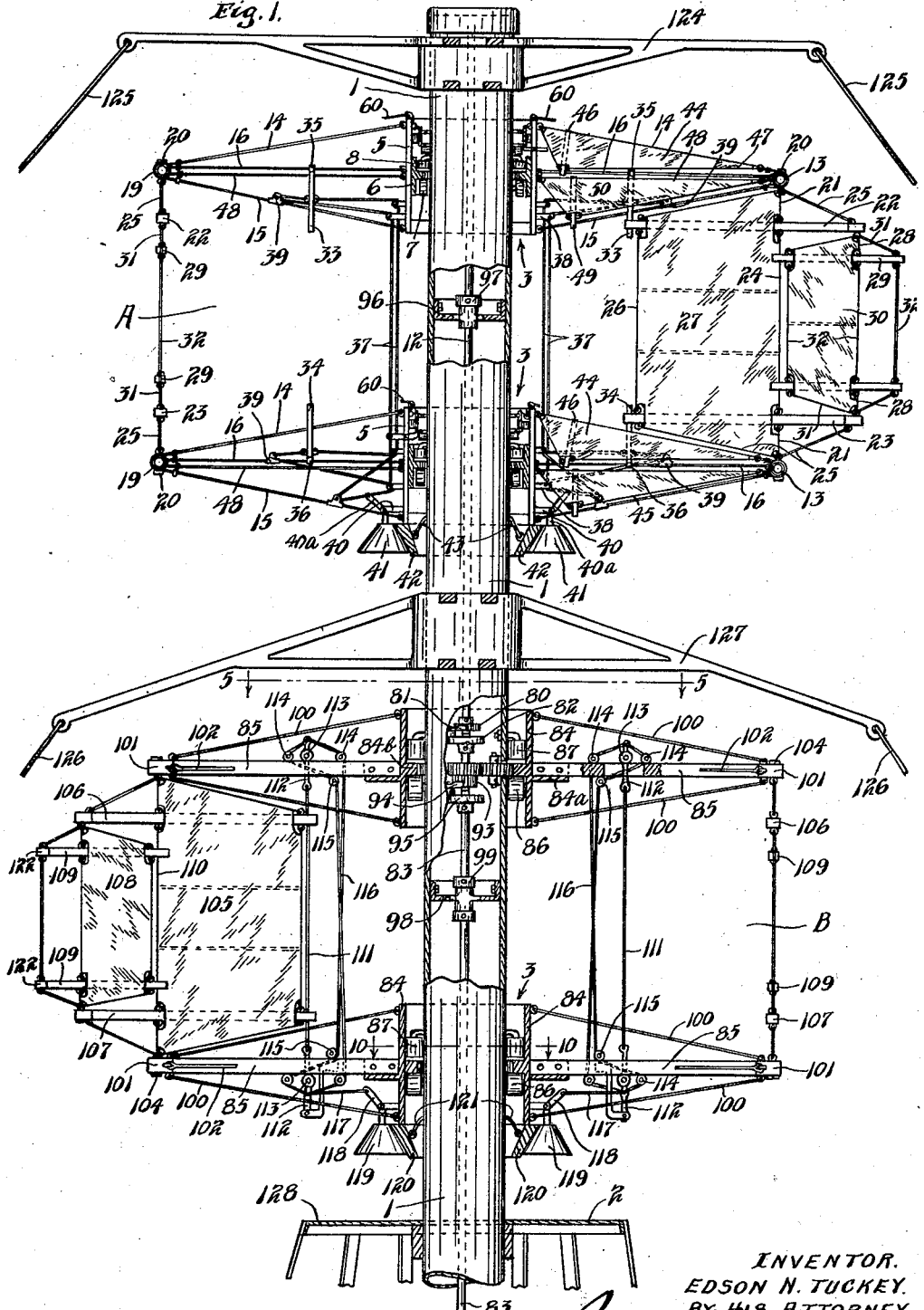
INVENTOR.
EDSON N. TUCKEY.
BY HIS ATTORNEY.

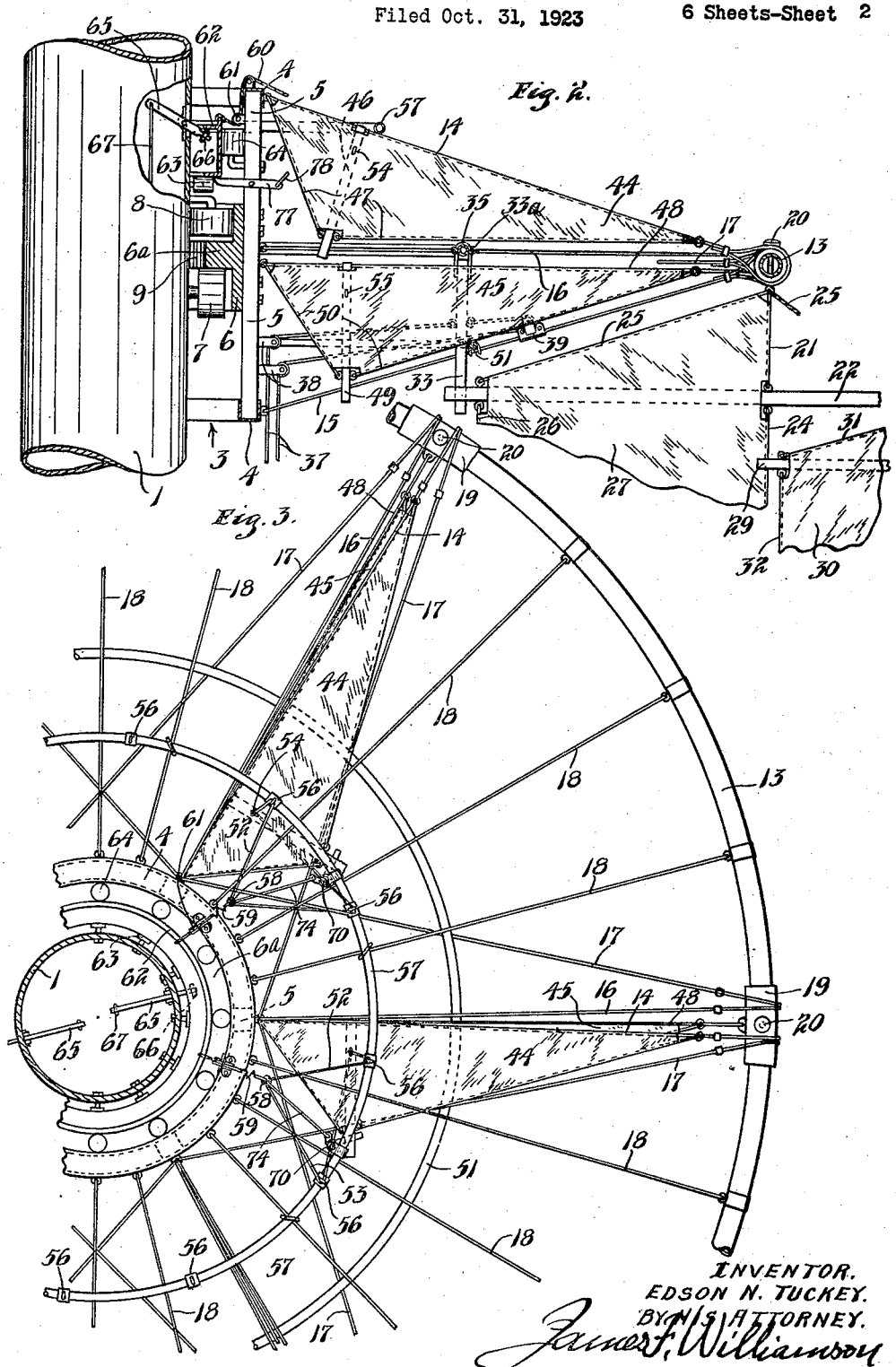

April 26, 1927.

E. N. TUCKEY

AIR MOTOR

Filed Oct. 31, 1923

INVENTOR.
EDSON N. TUCKEY.
BY HIS ATTORNEY.
James F. Williamson

April 26, 1927.
E. N. TUCKEY
AIR MOTOR
Filed Oct. 31, 1923
1,626,314
6 Sheets-Sheet 4
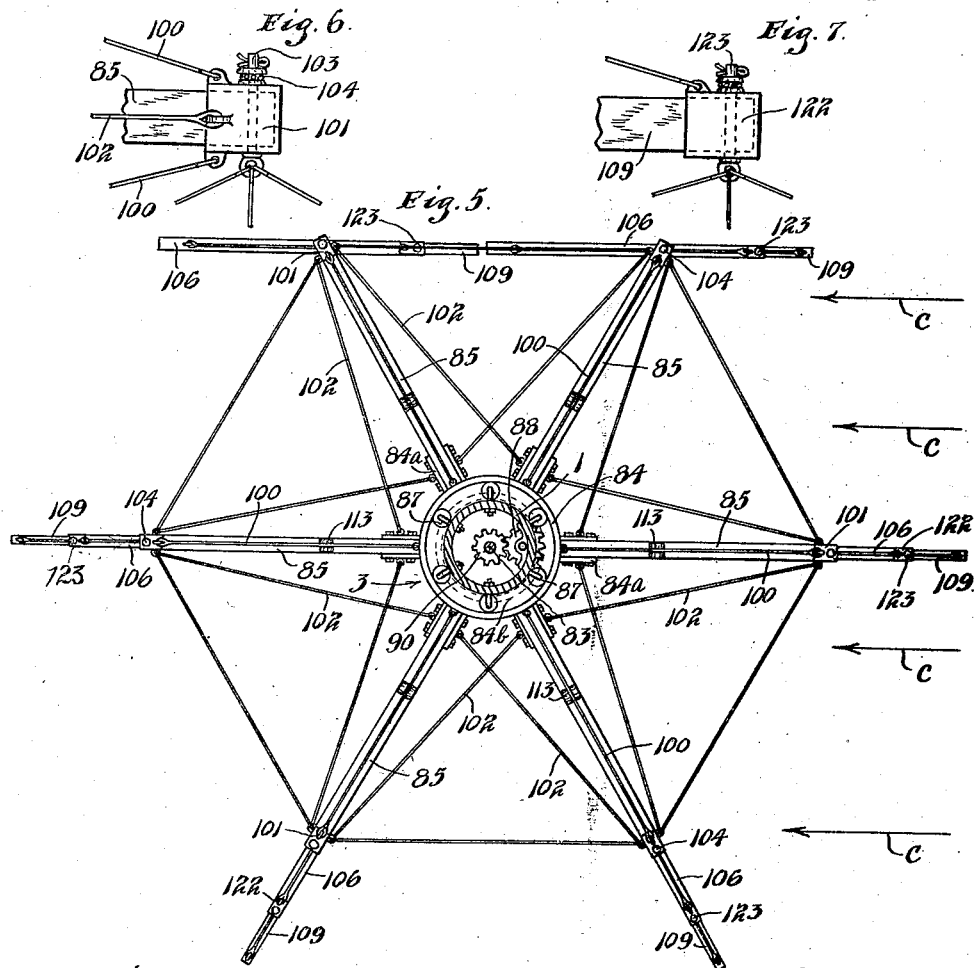
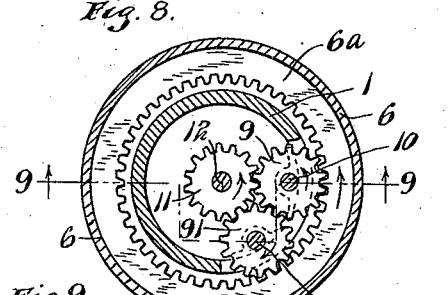
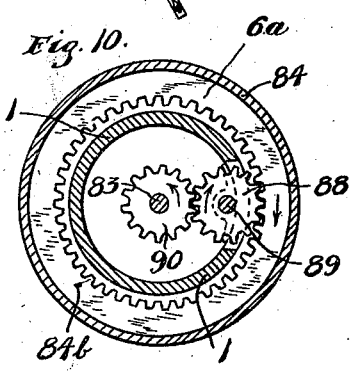
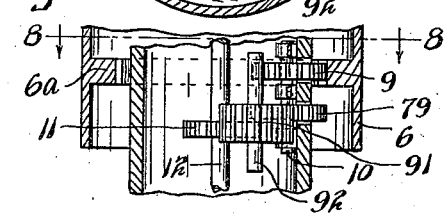
INVENTOR.
EDSON N. TUCKEY.
BY HIS ATTORNEY.
James F. Williamson

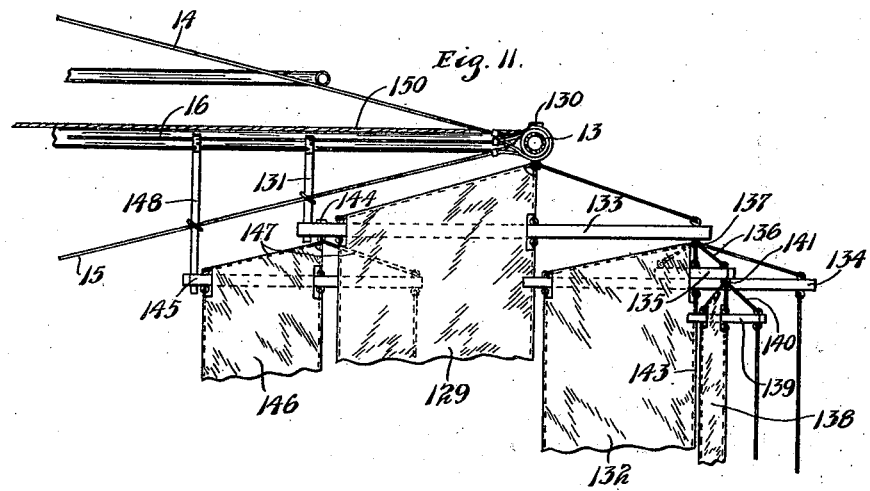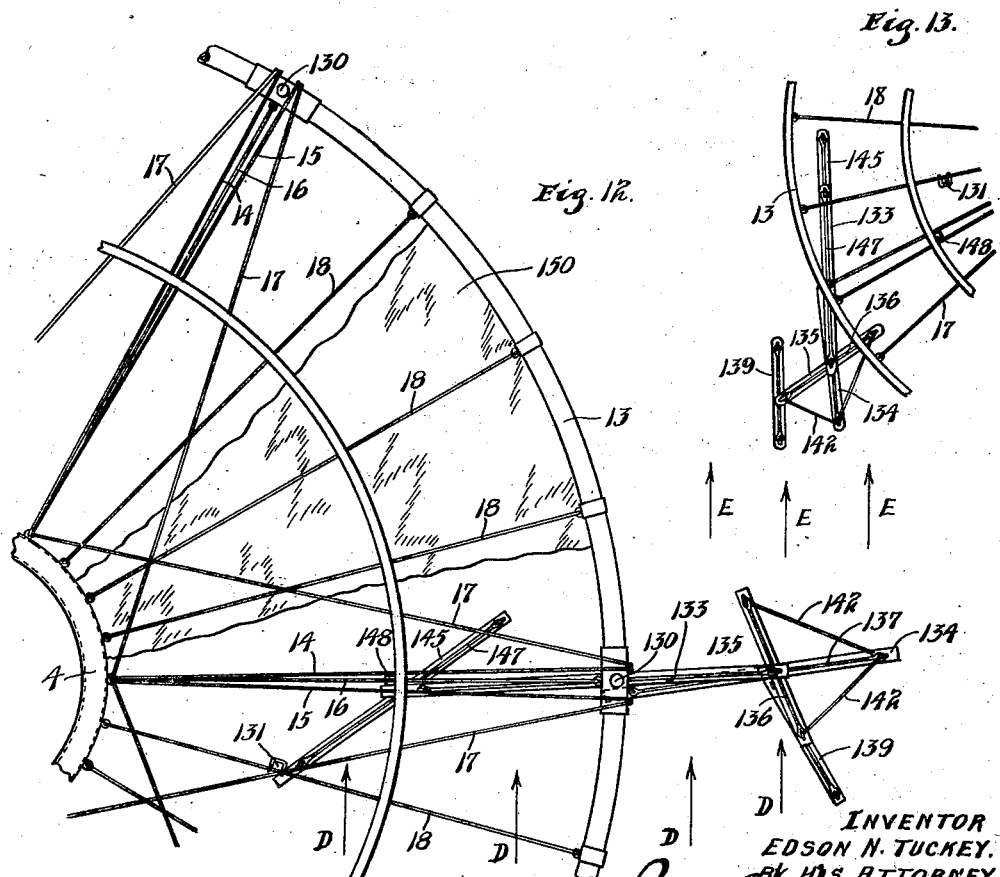

April 26, 1927.
E. N. TUCKEY
AIR MOTOR
Filed Oct. 31, 1923
1,626,314
6 Sheets-Sheet 6
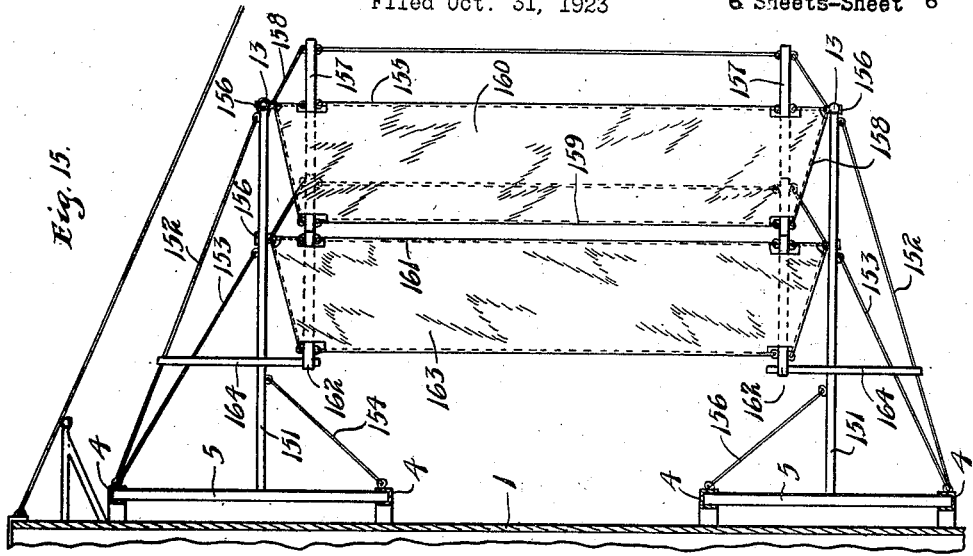
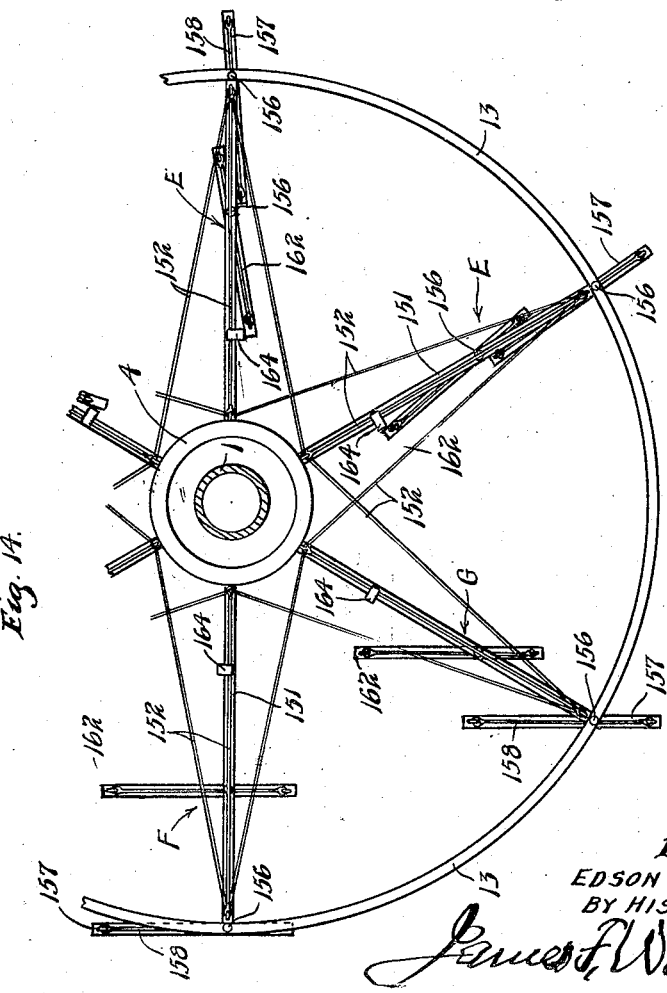
INVENTOR.
EDSON N. TUCKEY.
BY HIS ATTORNEY.

Patented Apr. 26, 1927.

1,626,314

UNITED STATES PATENT OFFICE.

EDSON NEWTON TUCKEY, OF MINNEAPOLIS, MINNESOTA.

AIR MOTOR.

Application filed October 31, 1923. Serial No. 671,867.

This invention relates to an air motor or, in other words, a motor adapted to be operated by the wind. With the present high and rising prices of fuel, more attention is being paid by engineers and inventors to the problem of utilizing the power of the natural elements, which power can efficiently be used without constant expenditure of money for fuel.

It is an object of this invention, therefore, to provide a simple and efficient device by which the power of the wind can effectively be utilized.

It is a further object of the invention to provide such an air motor comprising a support having frames revoluble thereabout, which frames carry sails, one of which sails is rotatable about a member extending between said frames and which also carries a sail.

It is still another object of the invention to provide a motor having a support and spaced frames revoluble thereabout, which frames carry sails rotatable about axes extending longitudinally of said support and also sails rotatable about axes extending substantially normal to said support.

It is also an object of the invention to provide such a motor having a simple and efficient form of revoluble frame which is light in construction and especially adapted for the attachment of the various sails carried thereby.

It is also another object of the invention to provide a novel mechanism for holding said revoluble sails against the wind for a portion of the revolution of the said frames, together with means for rendering said first mentioned means inoperative at certain times.

It is still another object of the invention to provide an air motor having spaced frames carrying a plurality of sails therebetween with means for holding said sails in relation to form a cup-shaped or box-shaped structure when held against the wind.

These and other objects and advantages of the invention will more fully appear from the following description made in connection with the accompanying drawings in which like reference characters refer to the same parts throughout the different views, and in which—

Fig. 1 is a view in side elevation partly in vertical section showing an air motor with separate revoluble units thereon;

Fig. 2 is a partial view in side elevation also partially in vertical section, of a portion of said air motor;

Fig. 3 is a top plan view of the structure shown in Fig. 2, both views being on an enlarged scale;

Fig. 5 is a horizontal section taken substantially on the line 5—5 of Fig. 1;

Fig. 6 is a view in side elevation of a detail on one of the arms of the air motor units;

Fig. 7 is a view in side elevation of a similar detail;

Fig. 8 is a horizontal section taken on the line 8—8 of Fig. 9;

Fig. 9 is a vertical section taken on the line 9—9 of Fig. 8, as indicated by the arrows;

Fig. 10 is a horizontal section taken on the line 10—10 of Fig. 1;

Fig. 11 is a view in side elevation similar to Fig. 2 showing a slightly modified form of the device;

Fig. 12 is a plan view of the parts shown in Fig. 11;

Fig. 13 is a plan view partially diagrammatic, showing another position of the parts shown in Fig. 12;

Fig. 14 is a partial plan view of a modified form of one motor; and

Fig. 15 is a partial vertical section thereof.

Figure 4:
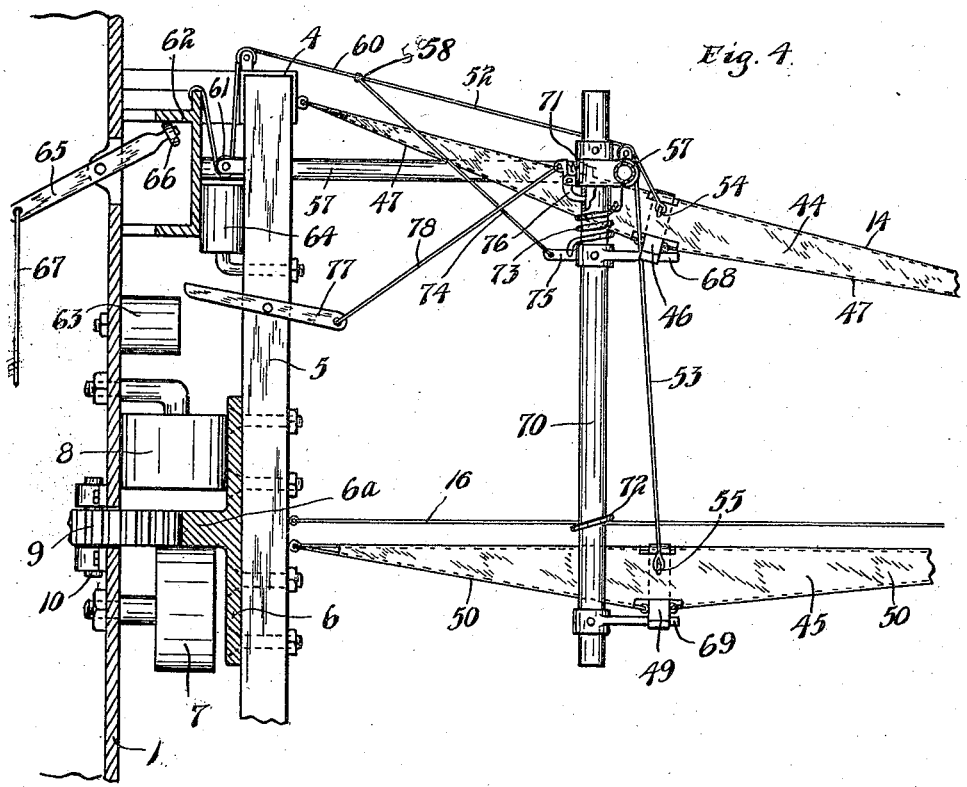
Fig. 4 is a view similar to the view in Fig. 2 showing a portion thereof on an enlarged scale with the parts in different positions.

This invention is an improvement on and further development of the invention shown in applicant's prior application filed June 28, 1923, S. N. 648,176.

Referring to the drawings, particularly Fig. 1, the motor comprises a support illustrated as a vertical central support 1. This support is in the form of a column which may be variously constructed, but in the embodiment of the invention illustrated, is shown as a cylindrical column. This column will be of considerable height supported from a suitable base 2 and will have mounted thereon for revolution thereabout, a plurality of motor units, two of which are illustrated and designated generally as A and B. In order to balance the strains about the central support 1, one of the units is adapted to rotate in the opposite direction to the adjacent unit. Referring to the unit A, the same is illustrated as comprising spaced frames, which frames are similar in construction and may be variously constructed. In the embodiment of the invention illustrated, said frames are shown as comprising hubs 3 (see Figs. 2 and 3), each of which comprises annular channel members 4 spaced longitudinally of the support 1 and to which are bolted, or otherwise suitably secured, a series of equally spaced vertically extending members 5. To the inner and central part of the members 5 is secured in any suitable manner, as by bolts, a ring 6, which ring is provided with a centrally inwardly extending rib 6ª, supported on a series of anti-friction rollers 7 supported in the column 1. Another set of vertically disposed anti-friction rollers 8 bear upon the inner side of the ring 6 and are supported from the column 1. The rib 6ª is formed as an internal gear which meshes with a pinion 9 (see Fig. 8) extending through a slot in column 1 and supported on a short shaft 10 carried in bearings secured to the inner side of the column 1. Shaft 10 carries another gear 89 which meshes with a gear 91 secured on a short shaft 92 also carried in bearings secured to the column 1. Gear 91 has a wide face and meshes with a gear 11 secured on a driving shaft 12 extending longitudinally and centrally of the column 1. Each of the frames having the hubs 3 also comprises a rim 13 spaced outwardly of the hub and disposed in a plane substantially normal to the axis of the column 1. While the rim 13 may be of any desired shape, in the embodiment of the invention illustrated, the same is shown of tubular form and is supported by a plurality of tension members extending therefrom to the hub 3. Said tension members comprise pairs of spaced top and bottom members 14 and 15, respectively, one of the ends of which are attached to the channel members 4 and the other ends of which are passed around tube 13 and provided with a suitable clamp holding the same together so that the tension or pull upon said members is in a line passing through the center of the tube 13 and also tension members 16 extending from substantially the center of the members 5 to and around the tube 13 and secured thereto in a manner similar to the members 14 and 15, it being understood that the tension members 14, 15 and 16 extend from the members 13 to the member 5 closest to the point of attachment of said members to the member 13. Other tension members 17 also extend from the member 13 adjacent the members 14 and 15 to the members 5 adjacent the member 5 to which members 14 and 15 are connected. Other tension members 18 extend between the members 13 and the channel members 4 between the members 5, being equally spaced in circumferential relation. The tube 13 is provided with a clamp or clevis 19 to which and around which the tension members 14, 15, 16 and 17 are secured and the members 19 are spaced about the member 13 in equally spaced relation, there being one of said members for each of the members 5, and in the embodiment of the invention illustrated, six of said members 5 are shown. The members 19 may be made in the form of a clamp and clamped to the tube 13 or the same may be spot welded thereto or held in any other suitable manner.

Extending through each of the members 19 is a revoluble headed member 20 provided with an eye at its lower end, and said member 20 will be provided with the usual anti-friction bearings, not shown. The frames comprising hubs 3 and members 13 are, as shown in Fig. 1, spaced along the support 1 and the member 20 in the lower member 13 will be in reverse position to the one in the upper member 13. From the eyes of the members 20, tension members or cables 21 extend and are secured to eyes adjacent one end of sail boom members 22 and 23, respectively. Another cable or tension member 24 extends between booms 22 and 23 in line with the cables 21. Other tension members in the form of wires or cables 25 extend from the eyes in members 20 to eyes disposed adjacent each end of the booms 22 and 23, and a sail carrying member 26 extends between said booms adjacent the ends of two of the members 25. A sail member 27 is secured at its sides to the members 21, 24, 25 and 26, and this sail is thus rotatable about the axes of members 20. From one end of the booms 22 and 23, tension members in the form of wires or cables extend and support booms 29. A sail member 30 is supported by said booms and by top and bottom members 31 and side members 32 secured thereto, the members 31 and other members 32 acting as bracing and supporting members for said booms. It will be noted that the sails 26 and 30 are somewhat wider than half the length of the respective booms and it will also be noted that the ends of the booms 29 contact the member 24 at one of their ends, which ends extend beyond the side of sail 30.

Stops are provided for the ends of the booms 22 and 23 adjacent the outer side of sail 26, which stops are shown as 33 and 34 (see Figs. 1 and 2). The stop 33, at its upper end, is hinged to a bracket 33ª which is, in turn, secured to an annular member illustrated as in the form of a tube 35 extending completely around the hub 3 of the supporting frame, said tube having eyelets at each side thereof to which the ends of the sections of the tension members 16 are secured. The lower stop 34 is hinged at its lower end to a similar bracket secured to a similar tube 36 also extending around the hub 3. The stop members 33 and 34 can thus swing inwardly toward column 1 and outwardly toward member 13. In order to hold these stops securely in position, substantially parallel to the axis of column 1 or, as illustrated, in vertical position, an annular member 51 is provided which extends completely around the hub 3 and is secured by suitable clamps to the tension members 15. It is desired at certain times to render the stops 33 and 34 inoperative and, for this purpose, the same have secured thereto at an intermediate point, the ends of a flexible member or cable 37 running over suitable sheaves secured in brackets 38 which are attached to the respective members 5, and the brackets 39 secured to the tension members 15 and 16. The cables 37 are so arranged that upon lengthwise movement of the same over their sheaves, the stop members 33 and 34 will simultaneously be swung inwardly or outwardly. Each cable 37 has attached to its lower portion, one end of a bell crank lever 40$^a$ pivoted to a bracket 40 secured to the member 5, the other end of which lever carries a conical roller 41 adapted to be contacted by a conical ring 42 extending about the column 1 and supported by flexible members 43 passing through slots in the column 1 over sheaves and downwardly in said column. It will thus be seen that upon outward movement of the rollers 41 the cable 37 will be moved and the stops 33 and 34 will be swung.

Each of the frames comprising hubs 3 and members 13 also carries therein the sails 44 and 45. The sail 44 is attached at its upper edge to one of the tension members 14 so as to be rotatable thereabout. Said sail is triangular in shape and is supported upon a boom 46, one end of which is hinged or pivoted on said member 14. Tension members 47 extend from adjacent one end of the booms to the ends of members 14 and form the sail carrying and attaching members. The lower end of boom 46 is adapted to contact tension member 16 so as to hold the sail substantially in a plane parallel with the axis of column 1.

The sail 45 is supported and swingable about a tension member 48 extending from member 5 to the member 13, about which member is also pivoted the boom 49 which supports said sail and has secured thereto the sail carrying members 50, which members also extend to the ends of member 48. The boom 49 is adapted to contact one of the tension members 15 when sail 45 is in a plane substantially parallel with the axis of column 1, or, as illustrated, in a vertical plane.

It is desired at certain times to raise the sails 44 and 45 so that they will be substantially in a plane normal to the axis of column 1 or, as illustrated, in substantially a horizontal plane, so that the same will not be propelled by the wind. For this purpose, flexible members 52 and 53 are secured, respectively, to eyelets 54 and 55 in the booms 46 and 49, and these flexible members pass over sheaves supported in brackets 56 secured in spaced relation on an annular member 57 extending about the hub 3 and secured by suitable clamps to the upper ones of the tension members 14 and 18. The flexible members or cables 52 and 53 are connected to an eyelet 58. A tension spring 59 is connected to the eyelet 58, and at its other end, is connected to a flexible member or cable 60 extending over a sheave carried in a bracket secured to the upper channel member 4, which member 60 then extends downwardly around the underside of a sheave 61 secured in a bracket carried on the inner side of the member 5 and cable 60 is then secured to the upper edge of a ring 62. The ring 62 extends about the column 1 and is supported and guided by anti-friction rollers 63 and 64 supported from the columns 1 and members 5, respectively. The member 62 is adapted to be raised by one or more levers 65 pivoted on brackets secured to the inner side of the column 1 and extending through slots in said column, said levers 65 having small rollers 66 at their outer ends having semi-cylindrical surfaces which bear upon the underside of a flange extending inwardly from the top of ring 62. The levers 65 have connected thereto a flexible member or cable 67 extending down through column 1 to a position within convenient reach of the operator. From the described connection it will be seen that when member 67 is pulled downward the ring 62 will be raised and booms 46 and 49, together with the sails 44 and 45 elevated.

In order to hold the sails against dropping backward or flapping downwardly in the wind, means are provided adapted to extend under the booms 46 and 49 when in their elevated position. Such means comprise arms 68 and 69 secured to a vertical shaft 70 which is carried in bearings 71 and 72. The bearing 71 is secured to the annular member 57, being suitably clamped thereto and the bearing 72 is secured to the flexible member 16. The shaft 70 is rotatable and normally is in a position with the arms 68 and 69 out of line with the booms 46 and 49 and is held in such position by a torsion spring 73 secured at one end to a lug extending downwardly from bearing 71, and at its other end, to a portion of arm 68. The shaft 70 is adapted to be rotated by a cable or flexible member 74 attached to an arm 75 projecting from the hub of arm 68. The cable 74 is attached at its other end to the eyelet 58 secured to cable 52 and said cable is provided with some slack so that it will not be drawn upon until after the cables 52 and 53 have been drawn substantially to the limit of their movement by ring 62. When the shaft 70 is so turned, by the cable 74, the arms 68 and 69 swing under the booms 46 and 49, as shown in Fig. 4. With the arms in such position, a spring actuated pawl 76 drops into a notch in shaft 70 so that the shaft is temporarily held in such position. Thus by a slight slacking of cable 67 the booms will drop back slightly and rest upon the arms 68 and 69. When the ring 62 is lowered to allow sails 44 and 45 again to assume a vertical position, the same will contact the lever 77 pivoted on the member 5 and the outer end of said lever 77 will move upwardly and disengage latch pawl 76 by means of the link 78 connected to said pawl and the outer end of lever 77.

The shaft 12 extends downwardly through column 1 and has secured to its lower end a ratchet member 80 adapted to engage a pawl 81 secured to a disk 82 secured to the upper end of another shaft 83 in alinement with shaft 12 and which extends downwardly through column 1. The shaft 83 is adapted to be driven by the motor B.

The motor B, as stated, like the motor A, revolves around the column 1. Said motor, likewise, comprises spaced frames, each having a hub 84 of any desired form but which, in the embodiment of the invention illustrated, is shown as a cylinder. Said hub has lugs 84$^a$, extending outward therefrom, of channel form and in which are seated radial arms 85, six of these arms being illustrated. Said cylinder 84 also has an inner flange 84$^b$ substantially at its central portion, which is supported upon rollers 86 spaced about and supported by column 1. The inner side of the cylinder also bears upon rollers 87 disposed on vertical axes and also supported by column 1. The flange 84$^b$ is formed as an internal gear, which gear meshes with another gear or pinion 88 carried on a short shaft 89 supported in bearings secured to the inner side of column 1, said gear 88 extending through a slot in said column. The gear 88 meshes with a gear 90 similar to gear 88 secured on a shaft 83. Shaft 83 is thus driven in the same direction as the shaft 12, even though the motor B rotates in an opposite direction to motor A. The gear 90 has a ratchet portion 93 depending therefrom and adapted to engage a pawl 94 carried by a disk 95 secured to the shaft 83. The shaft 12 is journaled in suitable bearings 96 secured to the inner side of column 1 and said shaft is supported by collar 97 secured thereto and resting upon the top of one of the bearings 96. The shaft 83 is also journaled in suitable bearings 98 in the column 1 and is, likewise, supported by a collar 99 secured thereto and resting upon one of said bearings 98. Extending from the top and bottom of the cylindrical hub 84 in line with each member 85, are tension members or braces 100 which are secured at their outer ends, (see Fig. 6) to the lugs formed on a bracket or shell 101 fit over the outer ends of member 85. Tension members 102 also extend from lugs at the sides of the members 101 and are secured at their inner ends to eyelets or lugs projecting from the sides of the channel-shaped lugs 84$^a$ on the members 85 adjacent the member 85 which carries the shell 101. Journaled in the ends of the members 85 are shafts 103 provided at one end with eyelets and also provided with suitable anti-friction bearings 104. The eyelets on members 103 on the upper member 85 are disposed downwardly while the eyelets on the lower members 85 are disposed upwardly. Sail members 105 carried on booms 106 and 107 are supported between and by the eyelets on members 103 in the same manner as sails 26 are supported from the eyelets on the ends of members 20 already described and the booms 106 and 107 support the sail member 108 similar to and supported and constructed in the same manner as the sail 30, already described. The sail 108 has booms 109 similar to the booms 29, which booms 109 are adapted to contact at one end against the member 110 forming one side of the sail 105 and which corresponds to the member 24 of sail 27.

The booms 106 and 107 are adapted to contact a stop in the form of a tension member 111 extending between eyelets on members 112 extending through slots formed in the members 85 secured to the members 112. On the outer side of the members 85 are a pair of rollers 113 (see Figs. 1 and 5). The said rollers are journaled on a short shaft or bolt extending through an aperture formed in the member 112. At each side of the slot in the member 85 through which member 112 extends are mounted sheaves 114 carried in small brackets secured to members 85 and another sheave 115 is carried on a smaller bracket at the inner side of each member 85. An endless cable 116 passes over sheaves 114 and 115 and extends between the upper and lower members 85. This cable 116 is secured to an eyelet formed on the outer ends of member 112, so that when said cable moves, said members 112 will be moved longitudinally of the members 85, the same rolling on the rollers 113 and traveling in the slots formed in members 85. Secured to the lower one of the members 112 is a link 117 which is attached at its other end to the upper end of a bell crank lever 118 similar to the lever 39 already described, which lever 118 carries a conical roller 119 at its lower end, the said lever being pivoted to a bracket extending outwardly from hub 84. The rollers 119 are adapted to be engaged and moved by frusto-conical ring 120 surrounding the column 1 and supported by flexible members 121 which run over sheaves supported at the inner side of the column and extend through slots in said column and downwardly therethrough. The outer ends of booms 106 and 107 have secured thereto brackets or shells 122 which carry the vertical and revoluble members 123 to which the cables carrying sail 108 are attached, as shown in Fig. 7.

The column 1 is suitably braced by the spider 124 at the top to which are attached the guy cables 125, and said column may be further braced and supported by the guy cables 126 extending to a suitable spider or bracing structure 127 secured to the column. The column will be supported at its bottom in some strong and suitable base member diagrammatically illustrated as 128.

In Figs. 11 to 13, a modified form of the motor A is shown. This structure has the frame, as illustrated in Figs. 1, 2 and 3, comprising the rim member 13. The sail 129 is supported on revoluble members 130 between the rim members 13 in the same manner as the sail 26, and the stop members 131 will be, in all respects, similar to the stop members 33, already described. A sail 132 is supported from one end of booms 133 of sail 129 in the same manner as the sail 30 is supported from booms 22, as already described, which sail 132 is carried on spaced booms 134. A cross arm 135 is rigidly secured to the boom 134 adjacent the outer side of sail 132 and is suitably braced at its ends by the tension members 136 extending to the eyelet in the revoluble member 137 from which the sail 132 is supported. From the outer end of the cross member 135 a sail 138 is supported, said sail having booms 139 braced and carried on suitable cables or tension members 140, in turn, secured to the eyelet on a revoluble member 141 journaled in the outer end of cross member 135, which revoluble member is similar to the revoluble member 103. The cross member 135 is also supported by tension members 142 extending from the top of the booms 134 adjacent its outer end to the ends of said cross member. It will be seen from this description that sail 138 is revolubly supported by members 141 journaled in the cross arms 135 and that the booms 139 of the sail 130 contact, at one of their ends, the outer members 143 of the sail 132. Owing to the angle which the cross arm 135 works with the boom 134, the sail 138 will stand at an angle with the sail 132, which angle is illustrated as somewhat greater than a right angle. The inner end of the boom 133 is also provided with a revoluble member 144 similar to the member 103 having an eyelet at its lower end from which is supported a boom 145 carrying a sail 146, said boom being suitably braced by tension members 147. A rigid stop 148 is secured to tension members 16 and 15 and project downwardly in position to be contacted with the end of booms 145. When the booms contact the members 148, the same, and the sail 146 carried thereby, stand at an angle to the sail 129, as shown in Fig. 12, which angle is quite a wide angle, as illustrated. In order to confine the moving air and cause the same efficiently to act on the sails, a thin plate 150 extends across the frames from approximately midway between members 4 to rim 13.

In the modification shown in Figs. 14 and 15, a motor is shown comprising the spaced members 4 connecting members 5, and the rim 13 shown in the form of a tube, said parts being of the same construction as above described. Radial members 151, however, extend from approximately the center of members 5 to the member 13 and said radial members may be either rigid bars or tension members formed of cable. The members 151 are suitably braced at the outer ends of the motor by tension members 152 and 153. Tension members 154 connect the inner or adjacent members 4 to the members 151. A tension member or cable 155 extends between tubes 13 and is mounted on revoluble members 156 mounted in said tubes, which members are similar to members 20 shown in Fig. 1 and above described. Booms 157 are attached to the members 155 and are braced by tension members 158 extended from members 156 to approximately the ends of said booms and said booms are further connected adjacent their ends by the members 159. A sail 160 extending across the greater part of the length of the boom is supported thereon and between members 158, 155 and 159. Other revoluble members 156 are mounted in the members 151 inward of the tubes 13, and a tension member 161 extends therebetween, said latter members supporting booms 162 which are braced and mounted in the same manner as the booms 157 and carry a sail 163 preferably of the same length as sail 160. The inner ends of brooms 162 contact at certain times the stops 164 which are supported from tension members 152 in the same manner as the stops 33 shown in Fig. 1 and already described. The said stops 164 may, of course, be provided with the controlling means shown and described for the stops 33, if desired. The ends of booms 157 contact the booms 162 radially beyond member 161 when the latter are against their stops, as shown at the positions E in Fig. 14, and this is the position of the booms and sails when the same are held against the wind. As the frame revolves, the sails and booms will swing into the positions F or G in Fig. 14. With the structure shown in these figures, therefore, a plurality of co-ordinate sails are supported in the motor revoluble about axes parallel to the axis of support 1, each of which, when stops 164 are thrown out, may rotate 360°.

In the operation, assuming that the stops 33 and 34 of motor A and the stops 112 of motor B are in operative position, the sails 26 and motor A will be held against the wind for a portion of the revolution of the frames having hubs 3. In Fig. 1, the wind is supposed to be blowing against the plane of the drawing and normal thereto and in Fig. 5 the direction of the wind is illustrated by the arrows C. As the frames rotate, the sails 26 on motor A and the sails 105 on motor B will contact their stops for a portion of the revolution, but as the frame continues to rotate, the said sails will swing away from the stops into alinement with the wind, as illustrated by the location of the booms 106 at the top of Fig. 5. As the frame continues to rotate the sails will again be brought against the wind and will again swing against their respective stops. It is thus seen that in a portion of the revolution of the frames the sails are held in position against the wind so as to propel the frames, but as the sails reach the opposite side of the frame they swing into the wind and do not act to propel or retard the rotation of said frames. The driving stress for the frames is thus always on one side of the frame. The sails 30 will also be held against the wind for a portion of the revolution of the frame, the booms 29 contacting the members 24 on the sails 26, but the sails 30 will, likewise, swing into the wind or parallel to the direction thereof at the opposite part of the revolution of the frame so that said sails 30 will be held against the wind at the same time as are the sails 26. If it be desired to render the stops 33, 34 or 112 inoperative, one of the flexible members or cables 43 or one of the flexible members or cables 121 will be pulled upon so as to tilt the rings 42 or 120 and swing the same to one side. As the rollers 41 or 119 thus come against the projected side of the said rings, they will be swung outwardly. This outward movement of the rollers will, through the oscillation of the bell cranks 40 or 118, move the endless cables 37 or 116, respectively. By this movement, stops 33 and 34 will be swung inwardly out of the path of the booms 22 and 23 and stops 112 will be moved inwardly out of the path of the booms 106 and 107. The sails 26 or 105, respectively, will then be allowed to swing freely in the wind and will not be held against the wind so that the motors will not be driven. If the motors A or B revolve at sufficiently high speed to throw the heavy conical rollers 41 and 119 outwardly, the cables 37 and 116 would also be moved and the respective stops of sails 26 and 105 moved inwardly so that the motors thus would automatically be thrown out of operation.

The sail 44 and 45 will, likewise, be held against the wind by the booms engaging the stops during a portion of the revolution of the motors, but said sails will also swing into horizontal planes in the wind in another portion of the revolution of the frame, so that the driving strains of these sails will only be exerted at one side of the motors. If it be desired to hold the sails 44 and 45 permanently in inoperative position, the cables 67 will be pulled downwardly to swing levers 65 and elevate the ring 62. This will pull upon the flexible members 52 and 53 and swing the sails 44 and 45 to the horizontal or inoperative position. The sails 44 and 45 held by the wind will resist upward movement and their openings 59 will be extended. As soon as these sails swing into the wind they will be raised by the contraction of springs 59. The sails will be swung somewhat past the horizontal position in this movement and toward the latter part of the movement of the sails the flexible members 74 will operate to turn shaft 70 and swing arms 68 and 69 under the booms 46 and 49 and the shaft 70 will be locked in this position by the pawl 76. The cable 67 can now be slightly slackened and the booms 46 and 49 will rest upon arms 68 and 69. When it is desired to restore sails 44 and 45 to their operative positions, cables 67 will be slackened to allow ring 62 again to descend and toward the latter part of this movement the ring will contact lever 77 and, through links 78, will disengage the latch 76 so that spring 73 will restore shaft 70 to its normal position and swing arms 68 and 69 out of the path of booms 46 and 49. The said booms will thus drop with the sails 44 and 45 to their vertical position and will be held against the wind in one portion of the revolution of the frame. It will be noted that motor A can be driven while motor B is idle and motor A will, through the pawl 81, drive the shaft 83. If a load carried by the motor is heavy enough to retard the speed of motor A or if great speed is desired, motor B can be thrown into operation and when its speed exceeds that of the motor A, pawl 94 will engage ratchet disk 95. The disk 95 will be driven through ratchet 93 and shaft 83 will then be driven also by the motor B.

With the machine shown in Figs. 11 and 13, when the sails are held against their stops and against the wind, the position of the sails will be as shown in Fig. 12 and a cup or box-shaped effect will be formed, thus giving a high efficiency of propulsion to the sail structure, the plate 150 serving effectively to confine the moving air. As the frame or motor rotates, the sail 129 will swing similarly to the sail 26 and the sail 146 will swing away from its stop 148 and around against the sail 129 so as to stand substantially parallel thereto, as shown in Fig. 13. The sail 132 will also swing away from its stop against sail 129 and will swing outwardly into the wind and the sail 138 will assume a position parallel to the wind. In Figs. 1, 2 and 3, the direction of the wind is indicated by arrows D and E, the position of the sails, when swung with the wind being illustrated in Fig. 13. In Fig. 4, the ring 62 is shown in its upper position, the sails 44 and 45 being substantially horizontal or in their inoperative position.

From the above description it is seen that applicant has provided a comparatively simple and efficient form of wind motor. The driving strains being applied only at one side of the revolving motors, the power of the wind is efficiently used and there is little resistance to the rotation of the motors. The structure is designed to be as light as is compatible with the necessary strength and, in actual practice, the motor units will be of considerable size. As many motors as desired can be arranged on one support. The motors can be used and independently controlled so that one or more motors may readily be thrown into or out of operation. The power from the device is taken off through one shaft and can be used to drive any desired machinery, such as electric generators. The sails used can be made of any suitable material and, if desired, provided with the usual or any suitable furling means, which specifically forms no part of the present invention.

It will, of course, be understood, that various changes may be made in the form, details, arrangement and proportion of the parts without departing from the scope of applicant's invention, which, generally stated, consists in a structure capable of carrying out the objects above stated, such as shown and described and set forth in the appended claims.

What is claimed is:

1. A wind motor having in combination, a revoluble frame, a propelling sail carried thereby, a second sail carried by said sail and revoluble about an axis parallel with the axis of said sail, and means for holding said sails against the wind during a portion of the revolution of said frame.

2. The structure set forth in claim 1, and means for rendering the last mentioned means inoperative to permit said sails to swing freely in the wind.

3. The structure set forth in claim 1, and a sail carried by said second mentioned sail and revoluble about an axis parallel to the axes of said sails, said last mentioned sail being held against the wind during one portion of the revolution of said frame.

4. A wind motor having in combination, a revoluble frame, a sail carried thereby for propelling the same, said sail being revoluble about an axis parallel to the axis of said frame, and a plurality of sails carried by said sail and revoluble about axes parallel to the axis of said sail.

5. The structure set forth in claim 4, and means for holding all of said sails against the wind for one portion of the revolution of said frame.

6. A wind motor having in combination, a revoluble frame, a sail carried thereby for propelling the same, revoluble about an axis parallel to the axis of said frame, and another sail carried by said frame for propelling the same, oscillatable about an axis substantially at right angles to the axis of said frame.

7. The structure set forth in claim 6, and means for holding both of said sails against the wind for a portion of the revolution of said frame.

8. A wind motor having in combination, a revoluble frame, a sail carried thereby for propelling the same, revoluble about an axis parallel to the axis of said frame, means for holding said sail against the wind for a portion of the revolution of said frame, means for rendering said last mentioned means inoperative, a sail for propelling said frame movable about an axis substantially normal to the axis of said frame, means for holding said latter sail against the wind for a portion of the revolution of said frame, and means for rendering said last mentioned means inoperative.

9. A wind motor having in combination, a support, spaced frames supported by and revoluble about said support, each comprising a circular rim, a plurality of spaced revoluble members extending between said rims surrounding said support, and sails mounted on each of said members for propelling said frames, said sails being revoluble about the axes of said members.

10. The structure set forth in claim 9, and a revoluble auxiliary sail independently carried by each of said sails.

11. A wind motor having in combination, a support, spaced frames supported by and revoluble about the same, each comprising a circular rim, and a plurality of sails mounted in said frame between said hub and rim and revoluble about axes substantially normal to the axis of said frame.

12. A wind motor having in combination, a support, a frame supported by and revoluble about the same, comprising a hub formed of annular members spaced longitudinally of said support and also spaced therefrom, and connected by spaced members extending longitudinally of said support, a rim spaced from said hub, tension members extending radially of said rim to said vertical members, and tension members extending from said rim to said annular members, and sails supported by said rim.

13. A wind motor having in combination, a support, a frame supported on and revoluble about the same comprising a hub, a rim spaced therefrom, tension members extending from said rim to said hub, a sail carried by said frame and revoluble about one of said tension members, an annular member between said hub and rim secured to said tension member, and a boom for said sail supported by said annular member.

14. A wind motor having in combination, a support, a frame supported on and revoluble about the same comprising a hub, a member spaced therefrom, tension members extending from said member to said hub, spaced pairs of sails carried by said frame, each pair comprising sails spaced longitudinally of said support, and each revoluble about one of said tension members and booms carried by said sails, respectively, and each supported by an annular member extending about said hub.

15. A wind motor having in combination, a support, a sail carrying frame revoluble about the same comprising a hub, a rim, and tension members connecting said hub and rim, anti-friction bearings on said support, an annular member secured to said hub supported on said bearings and formed as a driving gear.

16. A wind motor having in combination, a hollow support, a sail carrying frame revoluble about the same comprising a hub, a rim spaced from said hub, and members extending from said rim to said hub, sails swingable about said members, means for holding said sails against the wind in planes substantially parallel to the axis of said support, and means for raising said sails into planes substantially normal to the axis of said support for rendering said sails inoperative.

17. The structure set forth in claim 16, and means operated by said last mentioned means for holding said sails in said planes substantially normal to the axis of said support.

18. A wind motor having in combination, a hollow support a sail carrying frame revoluble about the same comprising a hub, a rim spaced from said hub, and members extending from said rim to said hub, sails swingable about said members, means for holding said sails against the wind in planes substantially parallel to the axis of said support, means for raising said sails into planes substantially normal to the axis of said support for rendering said sails inoperative, booms carried by said sails and means operated by said last mentioned means comprising members extending longitudinally of said support and carrying members adapted to extend under said booms.

19. An air motor having in combination, a support, a sail-carrying frame revoluble thereabout comprising a hub formed of annular members embracing and spaced longitudinally of said support and circumferentially spaced vertical members connecting said annular members, a rim spaced from said hub substantially centrally thereof, spaced sail carrying members journaled in said rim, circumferentially spaced radial tension members extending from said rim adjacent said sail carrying members to substantially the center of said vertical members, tension members extending from said rim adjacent said sail-carrying members to the top and bottom of the vertical members radially opposite the same, and tension members extending from said rim adjacent said sail-carrying members to the top and bottom of said vertical members at each side of the last mentioned vertical members.

20. A wind motor having in combination, a support, a frame revoluble thereon comprising members spaced along the longitudinal axis of said support, means connecting said members, and revoluble about an axis parallel to said axis, a sail carried by said means and revoluble therewith, means for holding said sail against the wind during a portion of the revolution of said frame, a sail radially spaced from said sail and supported by said means revoluble about an axis parallel to said first mentioned axis and having means engaging said first mentioned means to hold it against the wind during a portion of a revolution of said frame.

21. An air motor having in combination, a revoluble frame comprising a circular rim, radial members extending to said rim, and a plurality of series of sails revoluble about axes parallel to the axis of revolution of said frame, means for holding certain of said sails of each series against the wind for a portion of the revolution of said frame, other of said sails having means contacting means on said last mentioned sails so as to be held against the wind during a portion of the revolution of said frame.

22. A wind motor having in combination a tower, a sail carrying frame rotatable about the same, said tower constituting a support and an axle for said frame, said frame comprising a hub member formed of annular members surrounding said tower, and connected by spaced members extending longitudinally of said tower, and a central ring secured to the inner sides of said last mentioned members, a plurality of circumferentially spaced anti-friction means carried by said tower supporting said ring, a rim spaced outwardly of said ring, tension means connecting said rim and hub, and a plurality of radially arranged flexible propelling means carried by said frame.

23. A wind motor comprising a frame formed of spaced circumferentially extending members adapted to rotate about a central support, sail carrying means comprising spaced booms, a tension member extending between said first mentioned members and connected intermediately of said booms supporting the same and forming an axis of rotation therefor, tension members extending from the ends of said tension member to adjacent the ends of and between said booms, and a sail mounted between said first mentioned tension member and one of said last mentioned tension members.

24. The structure set forth in claim 23, and a pair of vertically spaced auxiliary booms carried by the other of said last mentioned tension members, and an auxiliary sail carried by said last mentioned booms.

25. A wind motor having in combination, a central support, a frame revoluble about the same, a plurality of series of sails carried in said frame, each of said series comprising radially spaced sails revoluble about axes parallel to the axis of said support, and a plurality of series of sails each comprising a plurality of sails revoluble about axes extending at an angle to said support.

In testimony whereof I affix my signature.

EDSON NEWTON TUCKEY.